Aug. 9, 1949.  F. SCHMID  2,478,427
MICROMETER CALIPER FOR ROUND BORES
Filed March 2, 1945
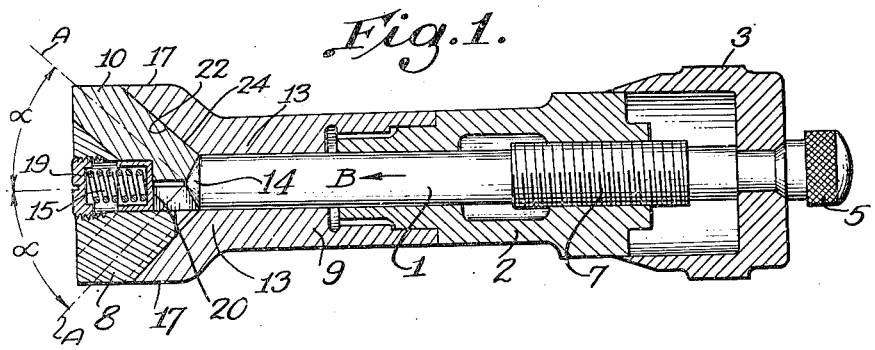
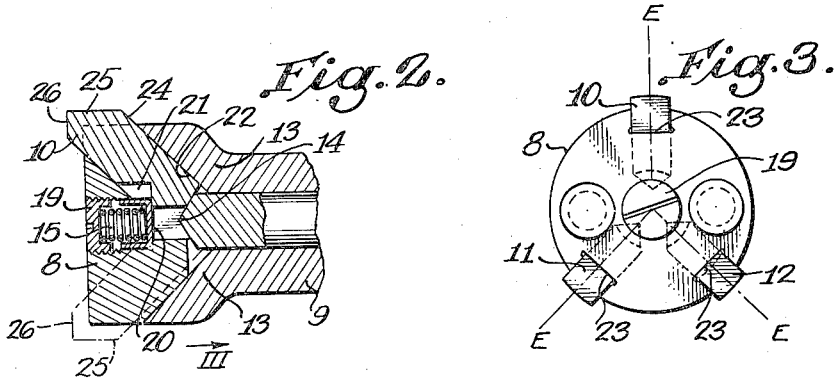
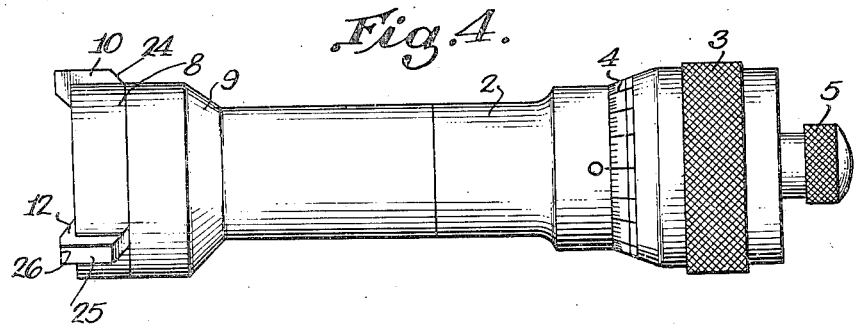
Inventor,
Freddy Schmid / Patented Aug. 9, 1949

2,478,427

UNITED STATES PATENT OFFICE 2,478,427

MICROMETER CALIPER FOR ROUND BORES

Freddy Schmid, Zurich, Switzerland

Application March 2, 1945, Serial No. 580,549
In Switzerland June 30, 1944

2 Claims. (Cl. 33—178)

There exist adjustable calipers with an eccentric arranged in their head. Such calipers are, indeed, very simple, but labour under the disadvantage that the measuring members are made to fit the wall of the bore only on two points so that the testing accuracy is merely a relative one.

In addition, there are adjustable gauges with radial measuring needles and tapered measuring spindles. This type of adjustable gauge is, however, extremely intricate and expensive in the manufacture so that owing to their high cost their use in common practice is rather limited. Beside this, with such instruments no so-called blind bore holes can be tested.

The present invention relates to an adjustable caliper comprising: a measuring head, adjustable measuring feelers and a measuring sleeve with beveled graduation, in which the aforesaid drawbacks are eliminated.

For this purpose, according to the invention, three measuring feelers are Y-arranged, i. e. starlike in the measuring head and slidably supported in guide ways thereof. Thereby the middle axes of these ways lie in radial planes of the measuring head and enclose each with the longitudinal axis of the body of the caliper an acute angle open to the front. Further, according to the invention, the inner ends of the feelers are held in operative connection with the forward end of the measuring spindle by spring pressure in such a way that upon advance of the spindle the feelers are pushed both axially and radially out of the measuring head, and upon turning back the spindle they re-enter the head under spring action.

In the accompanying drawing there is shown for purposes of illustration only one preferred embodiment of the invention.

Fig. 1 shows a longitudinal section through the adjustable caliper with drawn-in or reset measuring feelers, Fig. 2 a longitudinal section through the measuring head of the adjustable caliper with the feelers in their outermost limit position, Fig. 3 represents a front view of the measuring head seen in the direction of the indicated arrow in Fig. 2, and Fig. 4 is a lateral view of the adjustable caliper with the measuring feelers in their extreme limit position.

With reference to the illustrated example, numeral 1 designates a measuring spindle supported in the neck of the body of the caliper, on the free end of which spindle a measuring sleeve or drum with the graduation 4 and the thimble 5 are disposed. The measuring sleeve 3 and the thimble 5 are knurled in a well-known manner as shown in Fig. 4. The spindle 1 is provided with a precision thread 7 of 0.5 mm. pitch, and the graduation 4 of the measuring sleeve is divided into hundred divisions. 8 denotes the forward, and 9 the rearward part of the measuring head which threadedly engages the neck 2ª of the body 2.

Three prismatic feelers 10, 11 and 12 are Y-arranged and slidable in guide ways of the forward part of the measuring head. Thereby the middle axes A of these ways lie in radial planes E—E of the measuring head (Fig. 3) and enclose each together with the longitudinal axis of the body of the caliper (Fig. 1) an acute angle α open to the front. As apparent from Figs. 1 and 2, the inner ends of the feelers 10—12 closely fit the beveled front end 14 of the spindle 1. Numeral 15 marks a cylindric helical spring coaxially arranged in the head part 8 and bearing with one end against the screw stud 19 threadedly engaged therewith, the other end of the helical spring 15 being located in a bush 20 which rests in notches 21 of the feelers 10—12. The helical spring 15 therefore has the tendency to shift the feelers towards the middle axis of the body of the caliper, i. e. to hold them in their inner limit position as visible in Fig. 1.

The rearward head part 9 possesses at its front end a conical recess 22 of the opening angle 2×α, while the forward head part 8 engages the beveled recess 22 with a cone of identical conicity. In the forward head part 8 there are grooves 23 of rectangular cross section milled to conform to the section of the feelers 10—12, and which embrace the latter on three sides. The fourth flank 24 of each measuring feeler fits the forward inner face of the head 9 constituted by the beveled recess 22. Each testing feeler 10—12 possesses two flanks 25 and 26 at right angles to each other, whereby the flanks 25 extend in the direction of the surface 17 of the body, and the flanks 26 in the direction of the front face of the head part 8, i. e. parallel therewith.

For testing a bored hole, the caliper is set in the usual way into the bore. Thereupon the spindle 1 is displaced by turning the thimble 5 in the direction of the indicated arrow B, which causes a compression of spring 15 and the feelers 10—12 to be radially driven out of the head (Figs. 2 to 4) until the flanks 25 of the feelers fit the wall of the bored hole. Now, the bore gauge can conveniently be read on the graduation 4 of the measuring sleeve. The feelers being arranged at an angle of 45 degrees with respect to the longitudinal axis of the body of the caliper, the radial advance of the feelers corresponds exactly to the axial displacement of the spindle 1. If, consequently, the spindle at a thread pitch of, say, 0.5 mm. is turned once by 360 angular degrees, each feeler radially projects by 0.5 mm., or by 1 mm. in diameter out of the measuring head. One complete turn of the measuring sleeve 3 therefore corresponds to an increase in diameter of 1 mm. Since the graduation scale 4 is divided into a hundred parts, each division corresponds to a hundredth of a millimeter. On turning back the spindle 1 conversely to the direction of the arrow B, the spring 15 becomes detensioned, whereby the feelers 10—12 are again retracted into the measuring head 8, 9. The spring 15 has the tendency to keep the inner ends of the feelers 10—12 permanently bearing against the front end 14 of the spindle. The regulating range of the caliper hereindescribed can be chosen according to the desired testing accuracy. But the design according to the invention makes it possible to provide a larger regulating range than in the case of ordinary calipers.

It is also possible to exchange the measuring head together with the feelers against such of other diameter ranges. All these varied heads may selectively be screwed onto the threaded neck 2a of the body by engagement with the internally threaded part 9.

It would likewise be possible to select smaller or larger than 45 degrees the angle which the ways of the feelers enclose with the longitudinal axis of the body. The advantage of the selection of a smaller angle would consist in a more accurate testing result, that is to say the space between each two divisions of the measuring scale would then correspond to less than a hundredth of a millimeter.

What I claim is:

1. A caliper for measuring circular size, comprising a body having a central, longitudinal bore, a spindle having a tapered end, extending thru the bore and supported in a neck of the body, a two-part measuring head, having a rearward part secured to the neck, said rearward part having a conical recess at its front end, and a forward part having its rear end formed as a cone of identical conicity, seated in said conical recess, said forward part having rectangular shaped grooves terminating axially of the spindle at the contacting surfaces of the coacting cones of the two-part head, feelers slidably mounted in the grooves, with their inner ends engaging the tapered end of the spindle, said feelers having notches on their forward faces, said forward part of the two-part head having a recess in its front face, resilient means located within the recess for engaging within the notches of the feelers to maintain the same in engagement with the tapered end of the spindle.

2. A caliper for measuring circular size, comprising a body having a central, longitudinal bore, a spindle having a tapered end, extending thru the bore, a two-part measuring head, having a rearward part embracing the bore and having a conical recess at its front end, and a forward part having its rear end formed as a cone of identical conicity, seated in said conical recess, one of said parts having elongated grooves inclined at equal angles to the axis of the spindle, said grooves terminating axially of the spindle at the contacting surfaces of the coacting cones of the two-part head, feelers slidably mounted in the grooves, with their inner ends engaging the tapered end of the spindle, said feelers having notches on their forward faces, said forward part of the two-part head having a recess in its front face, resilient means located within the recess for engaging within the notches of the feelers to maintain the same in engagement with the tapered end of the spindle.

FREDDY SCHMID.

REFERENCES CITED

The following references are of record in the file of this patent:

UNITED STATES PATENTS

| Number | Name | Date |
|---|---|---|
| 1,571,783 | Aulenback | Feb. 2, 1926 |
| 1,579,334 | Poncet | Apr. 6, 1926 |
| 1,667,809 | Kushaw | May 1, 1928 |
| 1,722,834 | Bath | July 30, 1929 |
| 1,760,717 | Peglow | May 27, 1930 |
| 2,134,372 | Olson | Oct. 25, 1938 |
| 2,356,133 | Kieboom | Aug. 22, 1944 |